US009289887B2

(12) United States Patent
Papazian

(10) Patent No.: US 9,289,887 B2
(45) Date of Patent: Mar. 22, 2016

(54) WRENCH WITH INTEGRATED SUPPORT REST

(71) Applicant: Harry Papazian, Staten Island, NY (US)

(72) Inventor: Harry Papazian, Staten Island, NY (US)

( * ) Notice: Subject to any disclaimer, the term of this patent is extended or adjusted under 35 U.S.C. 154(b) by 214 days.

(21) Appl. No.: 13/927,155

(22) Filed: Jun. 26, 2013

(65) Prior Publication Data

US 2015/0000110 A1 Jan. 1, 2015

(51) Int. Cl.

| | |
|---|---|
| ***B23B 23/00*** | (2006.01) |
| ***B25B 23/00*** | (2006.01) |
| ***B25B 13/16*** | (2006.01) |
| ***B25B 13/50*** | (2006.01) |

(52) U.S. Cl.

CPC ................. *B25B 23/00* (2013.01); *B25B 13/16* (2013.01); *B25B 13/5058* (2013.01); *Y10T 29/49998* (2015.01)

(58) Field of Classification Search

CPC .. Y10T 29/49998; B25B 23/00; B25B 13/16; B25B 13/5058

See application file for complete search history.

(56) References Cited

U.S. PATENT DOCUMENTS

| | | | | |
|---|---|---|---|---|
| 2,637,235 A * | 5/1953 | Licari | ........................... | 81/180.1 |
| 3,320,836 A * | 5/1967 | Hagerman | ................... | 81/180.1 |
| 4,356,743 A | 11/1982 | Muschalek, Jr. | | |
| 5,263,392 A | 11/1993 | Schoen | | |
| 5,791,213 A | 8/1998 | Young | | |
| 6,523,818 B1 | 2/2003 | Le Vert et al. | | |
| 2006/0060037 A1 | 3/2006 | Haggerty | | |

* cited by examiner

*Primary Examiner* — Richard Chang

(74) *Attorney, Agent, or Firm* — Michael J. Feigin, Esq.; Feigin & Fridman

(57) ABSTRACT

The disclosed technology is a wrench or other tool with a top side, bottom side, left side, and right side. A working end of the tool has a clamp open or openable on the top, left, and right sides. A handle region defined by an elongated shape is adapted for gripping. A mid-region of unitary construction is attached to the handle region and a head region, wherein the head region is a separate piece fastened to the mid-region, such as by threads or bolts. A base with a flat side is formed of unitary construction, such as forged in the same metallurgy process, as the mid-region. The flat bottom side of the base may be angled to entirely rest on a surface when a corresponding bottom side of the handle region rests on the surface.

7 Claims, 8 Drawing Sheets

WRENCH WITH INTEGRATED SUPPORT REST

BACKGROUND OF THE DISCLOSED TECHNOLOGY

Presently, tools such as wrenches, such as pipe-wrenches, have elongated left and right sides, but narrow back and front sides. While this is useful for grasping onto an item of various sizes in the wrench, a problem arises in that the wrench will only rest on a surface on it's side, with the item held there-in hitting the ground. One may hold the wrench in his hand, or have a colleague do same while working on an item in the wrench, but this requires a second person's time and is not as sturdy as a vice. By using a vice, generally bolted to a stable work surface, one can grasp an item in place, and have it held there while working on the item which is grasped, but on the job (at a work site) vices are generally not available.

What is needed in the art is something which has the positive aspects of a stable vice, with the portability of a wrench.

SUMMARY OF THE DISCLOSED TECHNOLOGY

Embodiments of the disclosed technology include a wrench or other tool with a top side, bottom side, left side, and right side. A working end of the tool has a clamp open or openable on the top, left, and right sides. A handle region defined by an elongated shape is adapted for gripping. A mid-region of unitary construction is attached to the handle region and a head region, wherein the head region is a separate piece fastened to the mid-region, such as by threads or bolts. A base with a flat side is formed of unitary construction, such as forged in the same metallurgy process, as the mid-region. The flat bottom side of the base may be angled to entirely rest on a surface when a corresponding bottom side of the handle region rests on the surface.

The terms "top", "bottom", "left", and "right" are used universally to refer to an orientation with reference to the body of the wrench, as a whole, with the "bottom" referring to a side with the base, facing the ground, and the other directions relative to the ground. As such, the clamp is open or openable on a top, left, and right side, corresponding to the top, left, and right side of the wrench, and the bottom side is closed such that the top side of the clamp faces away from the bottom side of the base.

In a method of using a wrench, such as the one described above, one clamps an item to be worked on into the clamp, rests the tool on the base and an extreme end of the tool, the extreme end opposite an end of the tool where the clamp resides, and acts on the item with another object while the tool rests on the base and the extreme end.

DETAILED DESCRIPTION OF EMBODIMENTS OF THE DISCLOSED TECHNOLOGY

The disclosed technology is a wrench or other tool with a top side, bottom side, left side, and right side. A working end of the tool has a clamp open or openable on the top, left, and right sides. A handle region defined by an elongated shape is adapted for gripping. A mid-region of unitary construction is attached to the handle region and a head region, wherein the head region is a separate piece fastened to the mid-region, such as by threads or bolts. A base with a flat side is formed of unitary construction, such as forged in the same metallurgy process, as the mid-region. The flat bottom side of the base may be angled to entirely rest on a surface when a corresponding bottom side of the handle region rests on the surface.

Embodiments of the disclosed technology will become clearer in view of the following description of the drawings.

Figure 1:
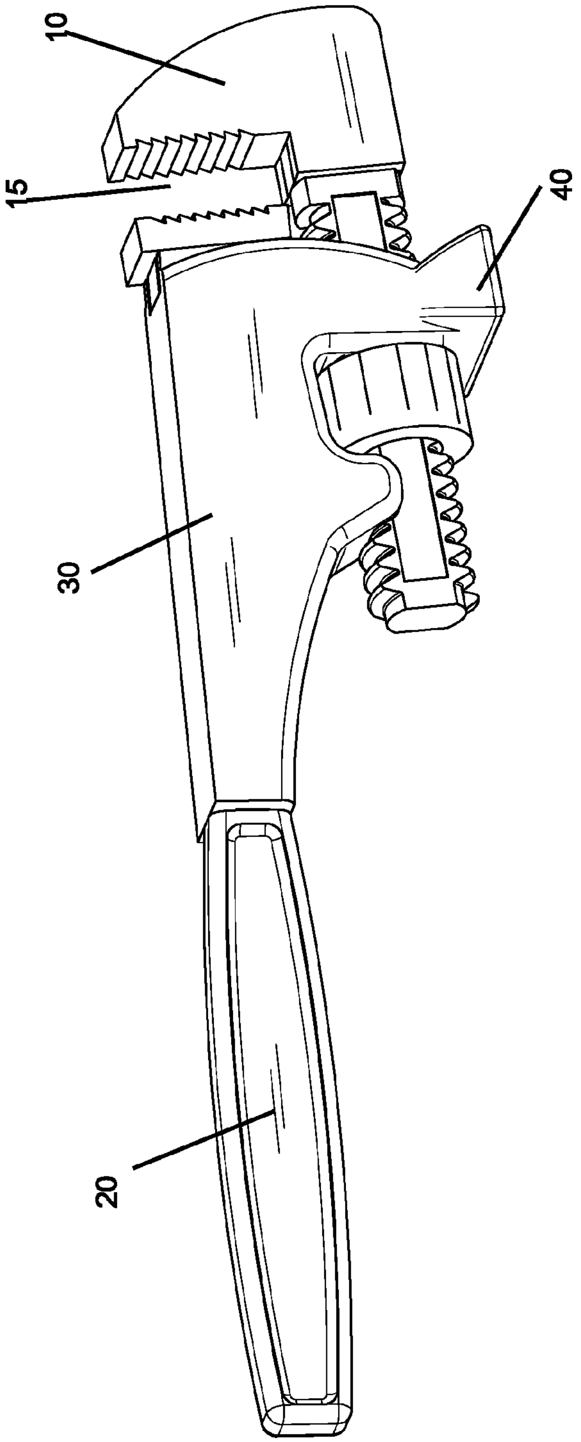
FIG. 1 shows a side perspective view of a wrench resting on a support disposed opposite a center region of an open side of the wrench.
Figure 2:
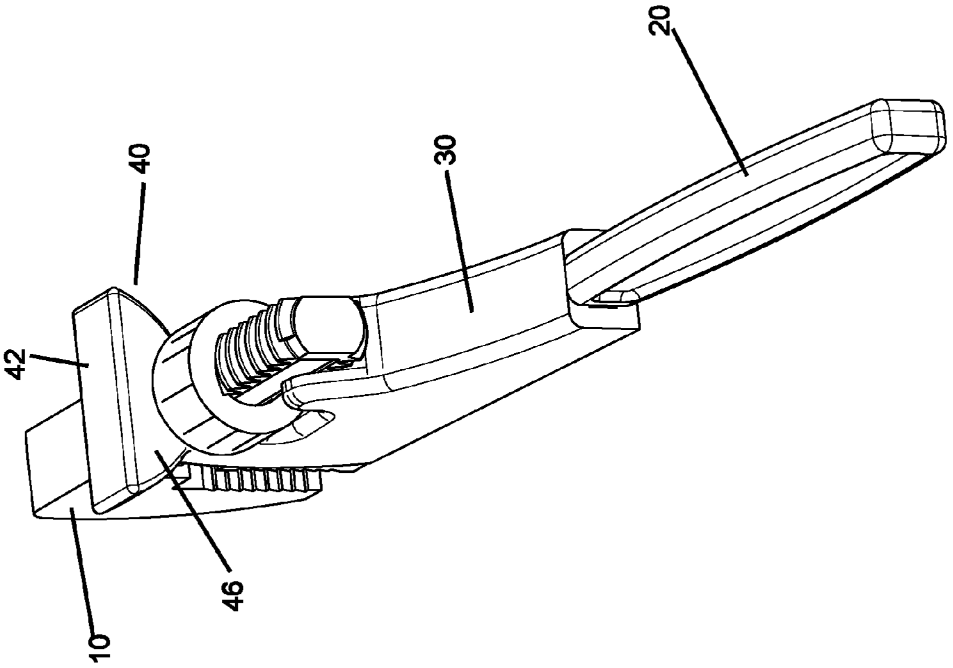
FIG. 2 shows a reverse perspective side, compared to FIG. 1, of the wrench.

FIG. 1 shows a side perspective view of a wrench resting on a support disposed opposite a center region of an open side of the wrench. The working portion of the wrench 15, which opens, closes, and grasps objects is on the head (top) section 10. A handle section 20 is at the opposite, bottom end. A mid region 30 connects between the handle 20 and head region 10. The mid region is defined as the region or separately constructed piece of the wrench which comprises the base 40. The head section 10 is defined as a region with a clamping head or working/business portion of the device 15. The handle section 20 is defined as an elongated, generally (as recognizable to an ordinary observer) equal circumference region adapted for grasping. The base 40, which will be discussed in greater detail below, FIG. 2 shows a reverse perspective side, compared to FIG. 1, of the wrench. Here, the bottom 42 of the base 40 is visible along with the back side 44. The base forms a unitary structure with the mid-region 30 of the wrench, and in embodiments, has a flat and/or planar and/or rectangular bottom side 42. The front 44 and back sides (46—see FIG. 4) have rounded and/or half-moon and/or flat sides. In this manner, the base 40 is stable, solid, and able to support the weight of the wrench-thereon, while using a minimum of extra material in order to keep the mass of the wrench down. The base 40 is narrower towards the body (mid-section 30) of the wrench, and wider at the bottom side 42, in embodiments of the disclosed technology.

Figure 3:
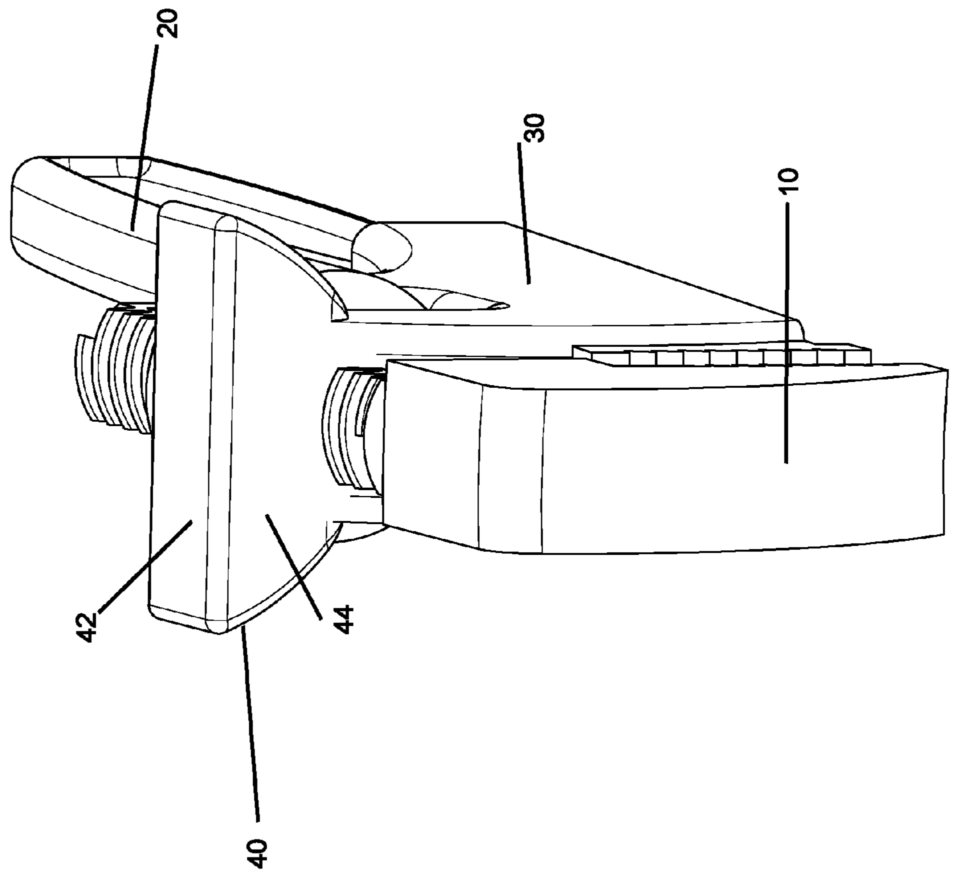
FIG. 3 shows a front elevation view of the wrench of FIG. 1.

FIG. 3 shows a front elevation view of the wrench of FIG. 1. Here, the top side 44 of the base 40 is shown, and may be equal in size to that of the bottom side (46—see FIG. 4).

Figure 4:
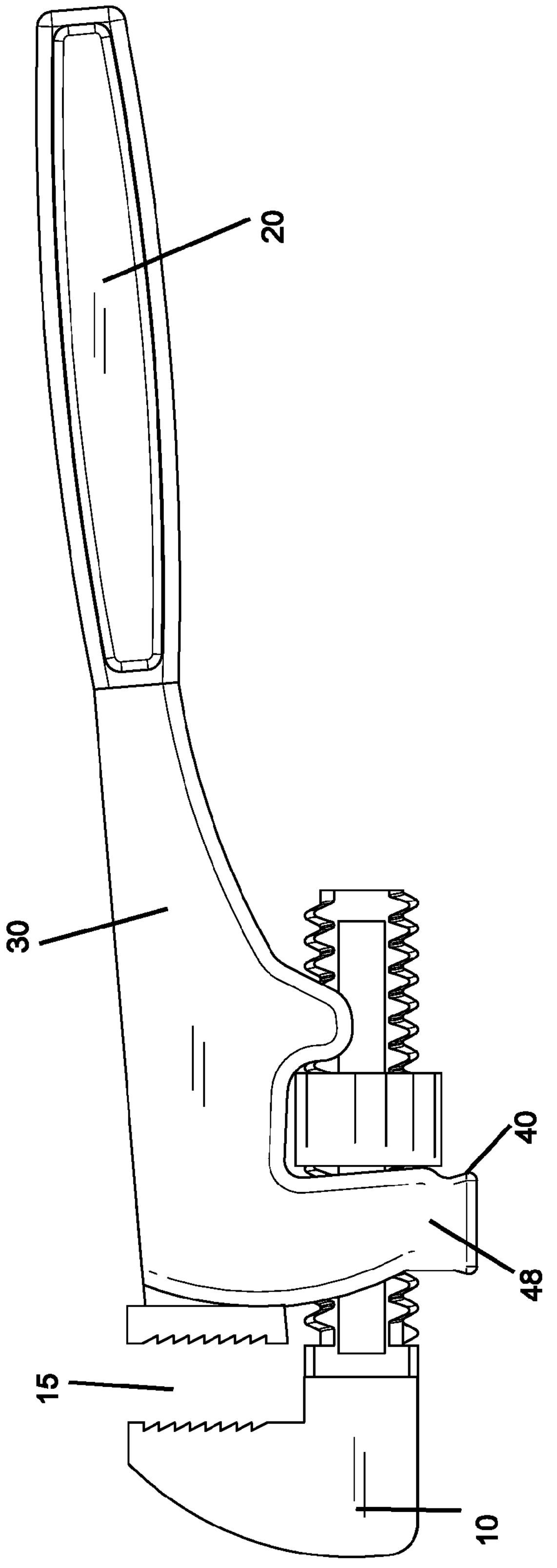
FIG. 4 shows a side view of the wrench of FIG. 1.

FIG. 4 shows a side view of the wrench of FIG. 1. The side 48 of the base 40 is visible, with the opposite side being identical in embodiments of the disclosed technology. The side 48 shares a continuous surface with the entire side of the mid-section 30 of the device. In this figure, a portal 15 within the clamping device is shown, the portal being the place where an item to be worked on is grasped with the working end 10 of the device. The base 40 has a bottom side, on which the base 40 and a bottom side of the handle 20 rest (the 'bottom side' defined as on the same side of the device as the bottom 42 (see FIG. 6) of the base 40). In this manner, the portal 15 is open on three sides, a top side, left side, and right side, while a bottom side is closed and is a wall of the working end 10 of the tool, corresponding to the bottom side of the base 40.

Figure 5:
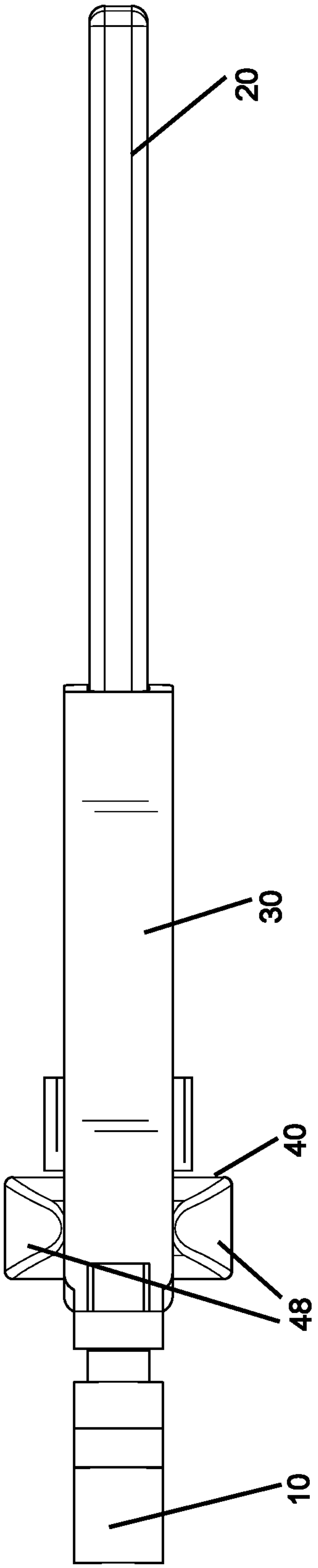
FIG. 5 shows a top view of the wrench of FIG. 1.

FIG. 5 shows a top view of the wrench of FIG. 1. As seen here, the sides 48 of the base 40 extend past the plane of the rest of the body of the mid-section 30 when viewed from the top. As such, the elongated tool (wrench) rests at an extreme end of the handle 20 and on the base 40, with the working end 10 held above the ground, when resting on the bottom of the base.

Figure 6:
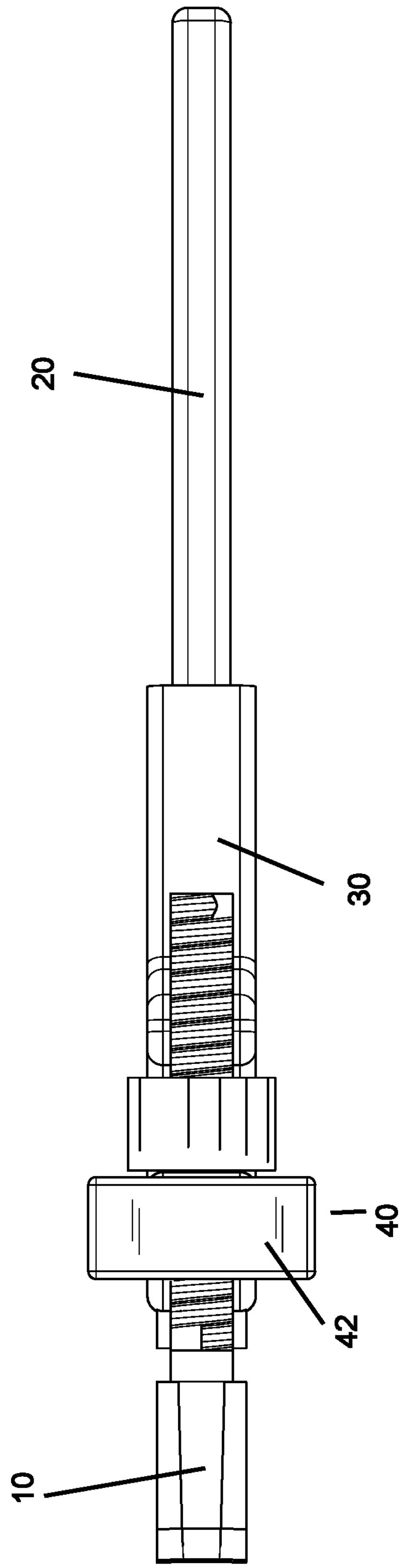
FIG. 6 shows a bottom view of the wrench of FIG. 1.

FIG. 6 shows a bottom view of the wrench of FIG. 1. Here, the bottom 42 of the base 40 is seen, and is rectangular, in this embodiment.

Figure 7:
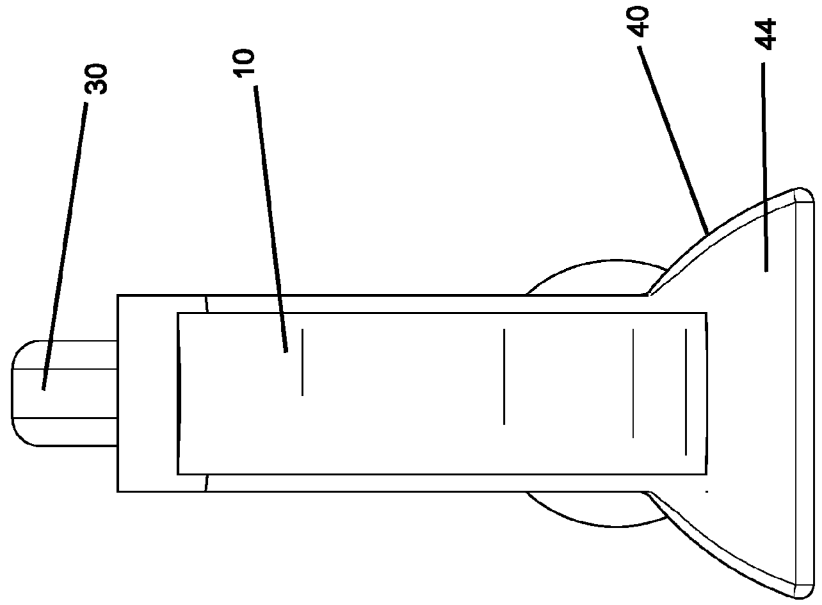
FIG. 7 shows a back elevation view of the wrench of FIG. 1.

FIG. 7 shows a back elevation view of the wrench of FIG. 1. The curved sides and flat back 44 of the base 40 are visible.

Figure 8:
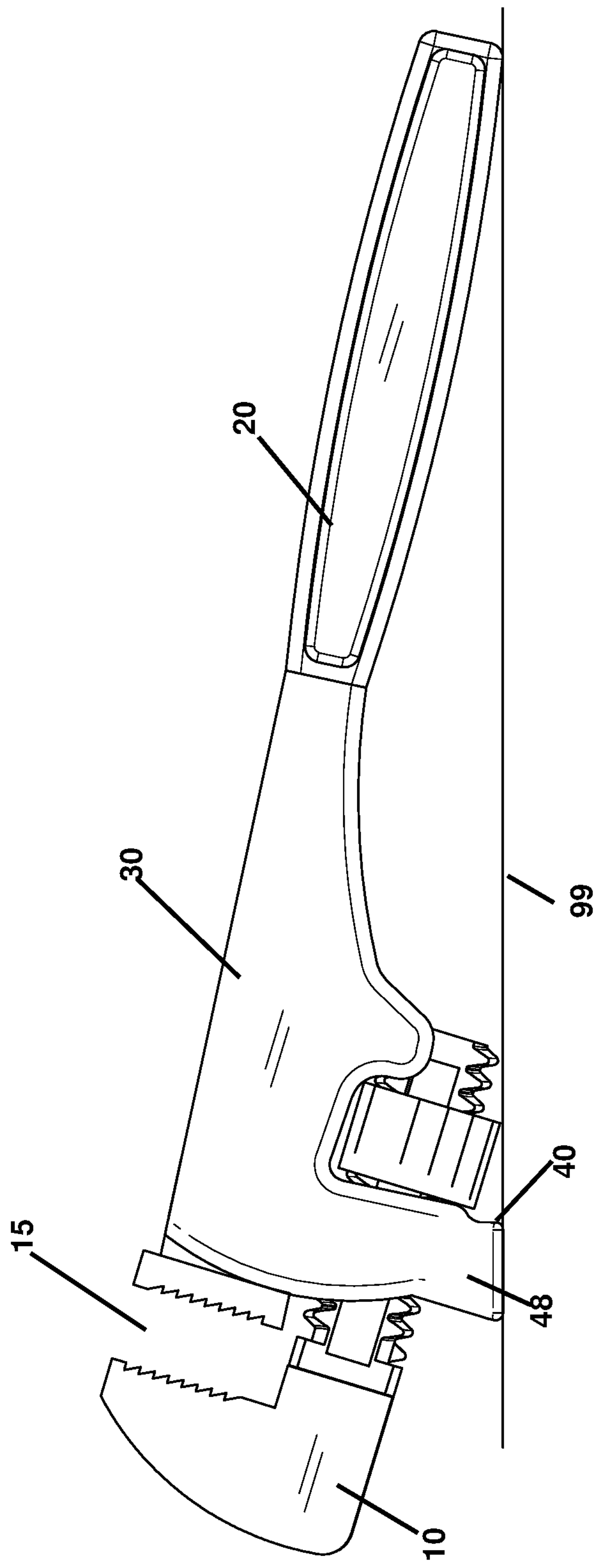
FIG. 8 shows a side view of the wrench of FIG. 1 which rests on a surface.

FIG. 8 shows a side view of the wrench of FIG. 1 which rests on a surface. The side 48 of the base 40 is visible, with the opposite side being identical in embodiments of the disclosed technology. The side 48 shares a continuous surface with the entire side of the mid-section 30 of the device. In this figure, a portal 15 within the clamping device is shown, the portal being the place where an item to be worked on is grasped with the working end 10 of the device. The base 40 has a bottom side, on which the base 40 and a bottom side of the handle 20 rest. The base 40 is angled and entirely rests on a surface 99 and is acute with the handle region 20 in this embodiment.

This wrench design allows one to place the wrench on the floor and keep it stable, so that it cannot tip move or slip, resulting in a much safer and easier way to perform this everyday task that plumbers regularly encounter. Although there are products on the market that are used to accomplish this goal (i.e., by placing the wrench in a rest to keep it stable), the problem is you need to carry an extra part to perform this task, making it more time consuming in that you have to constantly look for this separate piece. This wrench design allows a single, everyday wrench to be used, but when a plumber needs to separate two small pieces of pipe, the plumber simply places it on the floor and completes the work without missing pausing, saving time, money and frustration.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

The invention claimed is:

1. A wrench, comprising a top side, a bottom side, a left side, and a right side, comprising:

a working end with a clamp;

a handle region defined by an elongated shape adapted for gripping;

a mid-region of unitary construction attached to a handle region and a head region, wherein said head region is a separate piece fastened to said mid-region;

a base with a flat side formed unitarily with said mid-region, said base having rounded and curved half-moon front and back sides perpendicular to said left side and said right side of said wrench and extending past a furthest corresponding left and right side of said wrench, wherein said base is angled and entirely rests on a surface and is acute with said handle region.

2. The wrench of claim 1, wherein said clamp is open or openable on a top, left, and right side, corresponding to said top, left, and right side of said wrench, and said bottom side is closed such that said top side of said clamp faces away from said bottom side of said base.

3. A wrench, comprising a top side, bottom side, left side, and right side, comprising:

a working end with clamp;

a handle region defined by an elongated shape adapted for gripping:

a mid-region of unitary construction attached to a handle region and a head region, wherein said head region is a separate piece fastened to said mid-region;

a base with a flat side formed unitarily with said mid-region, wherein said flat bottom side of said base is angled and entirely rests on a surface while a corresponding bottom side of said handle region also rests on said surface.

4. A tool comprising a base oppositely disposed from a clamp, such that an open side of said clamp faces upwards while said tool rests on said base, said base extending outward from a generally flat plane of said tool and metallurgically forged together as a single unit with a body of a wrench, wherein said base is angled and entirely rests on a surface and is acute with said handle region.

5. A method of using a tool which comprises a base oppositely disposed from a clamp, comprising steps of:

facing an open side of said clamp upwards;

clamping an item to be worked on into said clamp;

resting said tool on said base and an extreme end of said tool, said extreme end opposite an end of said tool comprising said clamp;

acting on said item with another object, while said tool rests on said base and said extreme end, wherein said base is angled and entirely rests on a surface and is acute with said handle region.

6. A tool comprising a unitary constructed mid-region having a line of symmetry along an elongated most length, a base on a bottom side extending past otherwise flat left and right sides of said mid-region, two separate protrusions extending in a same direction from said mid-region, a first protrusion thereof being said base and a second protrusion spaced apart from said base, each of said two separate protrusions having a portal through which a threaded screw is engaged;

a handle extending from said mid-region and rising at an obtuse angle with respect to said base, wherein said base is angled and entirely rests on a surface and is acute with said handle region.

7. The tool of claim 6, wherein said base is in a shape of a half-moon with flanges winder than an entirety of a rest of said tool.

* * * * *